United States Patent
Fujimori et al.

[11] Patent Number: 5,852,487
[45] Date of Patent: Dec. 22, 1998

[54] LCD DEVICE HAVING AN INPUT FUNCTION AND POLYMER SUBSTRATES HAVING DUAL FUNCTION

[75] Inventors: Kohichi Fujimori, Nabari; Tokihiko Shinomiya; Ippei Inou, both of Nara; Shuichi Kozaki, Nara, all of Japan

[73] Assignee: Sharp Kabushiki Kaisha, Osaka, Japan

[21] Appl. No.: 787,904

[22] Filed: Jan. 23, 1997

[30] Foreign Application Priority Data

Jan. 25, 1996 [JP] Japan .................................. 8-011275

[51] Int. Cl.⁶ ..................... G02F 1/1335; G02F 1/1333; G09G 3/36; G09G 5/00
[52] U.S. Cl. ........................... 349/162; 349/12; 349/156; 349/158; 345/104; 345/173
[58] Field of Search ..................... 349/155, 156, 349/12, 158, 162; 345/104, 173

[56] References Cited

U.S. PATENT DOCUMENTS 5,583,675  12/1996  Yamada et al. ......................... 349/155

FOREIGN PATENT DOCUMENTS

| | | |
|---|---|---|
| 1-118819 | 5/1989 | Japan . |
| 3-121523 | 5/1991 | Japan . |
| 4-243412 | 8/1992 | Japan . |
| 7-120730 | 5/1995 | Japan . |
| 8-122738 | 5/1996 | Japan . |
| 8-234162 | 9/1996 | Japan . |

*Primary Examiner*—William L. Sikes
*Assistant Examiner*—Toan Ton
*Attorney, Agent, or Firm*—David G. Conlin; Peter F. Corless; Dike, Bronstein, Roberts & Cushman, LLP

[57] ABSTRACT

A liquid crystal display apparatus having an input function includes a first substrate, a second substrate, and a third substrate; a display medium provided between the first substrate and the second substrate; a first electrode provided between the first substrate and the display medium; a second electrode provided between the second substrate and the display medium; spacers for supporting the second substrate and the third substrate with respect to each other; and at least two electrodes provided between the second substrate and the third substrate. The display medium includes a polymer projection and a liquid crystal region at least partially surrounded by the polymer projection, and the first, second and third substrates are each formed of a polymer material, at least one of the first, second and third substrates has a polarizing function, and at least one of the first, second and third substrates has a phase contrasting function.

15 Claims, 8 Drawing Sheets

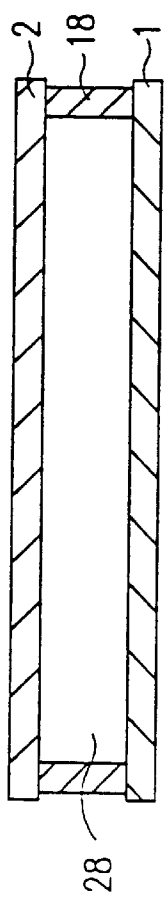
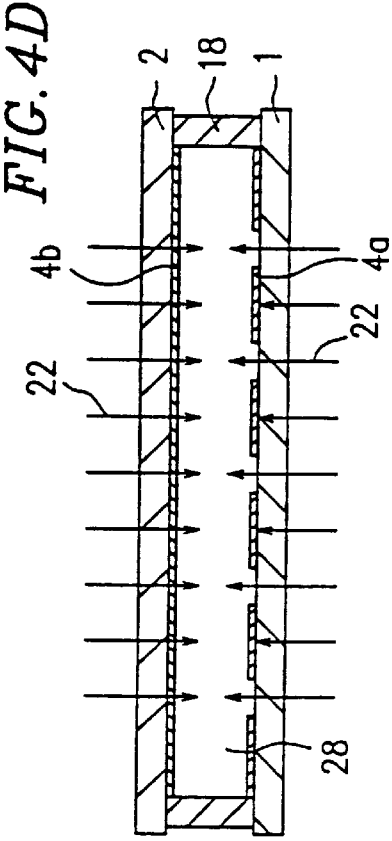
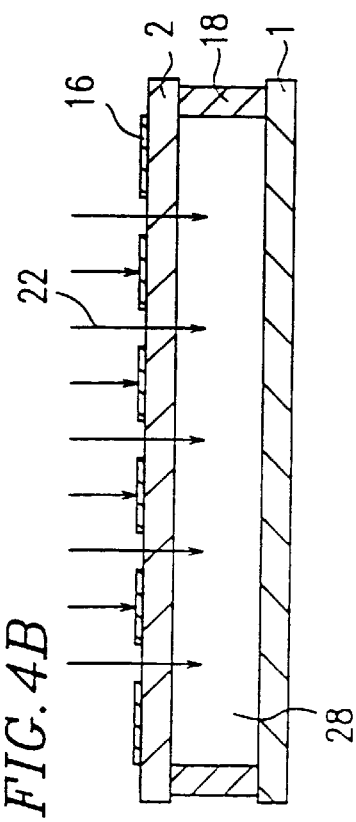
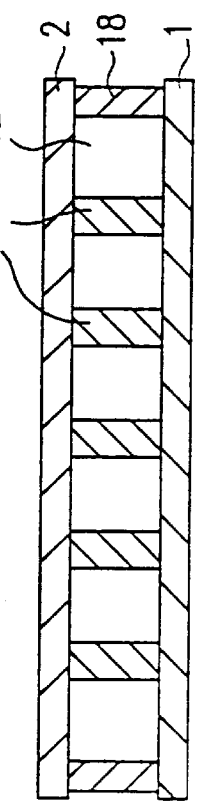

LCD DEVICE HAVING AN INPUT FUNCTION AND POLYMER SUBSTRATES HAVING DUAL FUNCTION

BACKGROUND OF THE INVENTION

1. Field of the Invention

The present invention relates to a liquid crystal display apparatus having an input function used for electronic devices such as laptop computers, notebook computers, wordprocessors, and electronic diaries, and a method for producing the same. More particularly, the present invention relates to a liquid crystal display device having a pressure-sensitive or an electrostatic induction input function which includes sufficiently light and sufficiently rigid plastic substrates, and a method for producing the same.

2. Description of the Related Art

Liquid crystal display apparatus (hereinafter, referred to as "LCD apparatus") having an input function produced today includes an LCD device and a pressure-sensitive input device. The pressure-sensitive input device is, for example, a transparent touch panel which allows visible light to transmit therethrough (hereinafter, referred to as a "touch key device").

FIG. 13 is a cross sectional view of a conventional reflection-type LCD apparatus 100 having an input function. The LCD apparatus 100 includes an LCD device 100a and a touch key device 100b.

The LCD device 100a includes glass substrates 101 and 102 which are opposed to each other, a liquid crystal layer 112 interposed between the glass substrates 101 and 102, electrodes 104a and 104b respectively provided on the inner surfaces of the glass substrates 101 and 102, and alignment layers (not shown) provided between the electrode 4a and the liquid crystal layer 112 and between the electrode 4b and the liquid crystal layer 112. The LCD device 100a further includes polarizing plates 125a and 125b respectively on the outer surfaces of the glass substrates 101 and 102, and a reflection plate 110 on an outer surface of the polarizing plate 125a. The LCD device 100a still further includes a seal 118 between the glass substrates 101 and 102 along a periphery thereof for sealing the liquid crystal layer 112, and a plurality of spacers 113 inside the seal 118.

The touch key device 100b includes a glass substrate 103a having a thickness of about 1 mm, facing a flexible polymer film substrate 103b having a thickness about 0.05 mm to 0.5 mm. A transparent electrode 105a used for data input is provided on a surface of the glass substrate 103a, the surface being opposed to the polymer film substrate 103b, and a transparent electrode 105b used for data input is provided on a surface of the polymer film substrate 103b, the surface being opposed to the glass substrate 103a. A seal 132 is provided between the glass substrate 103a and the polymer film substrate 103b along a peripheral thereof, and a plurality of spacers 114 are provided inside the seal 132.

The LCD device 100a and the touch key device 100b are provided so that the polymer film substrate 103b is opposed to the glass substrate 102 with a space 137 interposed therebetween. The space 137 prevents the LCD device 100a from being deformed when the touch key device 100b is pressed for data input. Such deformation of the LCD device 100a typically causes a defective display.

The conventional LCD apparatus 100 substantially having the above-described structure has the following problems.

(1) The LCD apparatus 100 is excessively heavy and thick due to the four substrates included therein.

(2) Due to the excessive thickness, the input point of the touch key device 100b which has been pressed for data input may be undesirably offset from the display point of the LCD device 100a at which an image is to be displayed because of parallax. Due to this offset, the image is accompanied by a shadow. The excessive thickness may also generate a double image when the LCD device 100a is observed at an angle. Thus, accurate and precise image formation on the display screen of the LCD device 100a is difficult.

(3) Due to light reflection by the glass substrates 101 and 102 and due to the space 137 between the LCD device 100a and the touch key section 100b, the light transmittance through the LCD apparatus 100 is decreased, resulting in excessively darker images.

In order to solve the above-described problems, the present inventors have proposed in Japanese Laid-Open Patent Publication No. 7-120730 that the liquid crystal layer between the glass substrates in the LCD device be divided into smaller regions each surrounded by a polymer projection. The LCD device and the touch key device are combined with no space interposed therebetween. The polymer protection prevents the LCD device from being deformed by the pressure applied on the touch key device, thus preventing a change of the color into an undesirable color. However, the number of the substrates is still four. Accordingly, even if all the substrates are formed of a thin plastic film, the LCD apparatus is still excessively thick. Furthermore, since the polarizing plates, the phase plate, the reflection plate, and other members required for display need to be added to the four-substrate structure, the thickness of the entire LCD apparatus increases.

Japanese Laid-Open Patent Publication No. 4-243412 proposes an LCD apparatus shown in FIG. 15. The LCD apparatus includes an LCD device and a touch key device, the entirety of which includes three substrates, i.e., a plastic substrate 101 having a polarizing function, a plastic substrate 102, and another plastic substrate 103 having a polarizing function. Such an LCD apparatus has the following problems.

(1) When the LCD apparatus is used in the STN (super twisted nematic) mode, the birefringence of light is utilized for the display. Accordingly, deterioration of the display quality such as reduction in contrast occurs. Namely, an undesirable color is added to the black and white display, resulting in a narrower viewing angle. In order to compensate for such problems, the LCD apparatus need to include a phase plate between the polarizing plate and the liquid crystal layer. In the LCD apparatus described in the above-mentioned publication, the phase plate needs to be provided separately.

(2) The LCD device tends to be destroyed relatively easily when the touch key device is pressed. Furthermore, as shown in FIG. 14, when a point of the surface of the touch key device is pressed by pin 130 or the like for data input, ring-shaped and curved deformations 131 of the surface are generated. When a line is drawn from such a state, the trace of the drawing or an afterimage is displayed. Thus, the display quality is deteriorated.

The present inventors have proposed in Japanese Patent Application No. 6-262630 an LCD apparatus, in which the LCD device and the touch key device are combined with no space interposed therebetween so that the entirety of the LCD apparatus includes three substrates. A second substrate interposed between two other substrates acts as a phase plate, and one of the other two substrates acts as a polarizing plate. The LCD apparatus which has such a structure is thinner than the LCD apparatus described in Japanese Laid-Open Patent Publication No. 7-120730, but is not sufficiently simple or sufficiently thin.

The present inventors have proposed in Japanese Laid-Open Patent Publication No. 3-121523 that a plastic substrate also acting as a phase plate be used for the touch key device. A plastic substrate realizes proper black and white display in the STN mode, thereby increasing the contrast ratio, and thus improving the display quality. In the LCD apparatus described in the above-mentioned publication, the LCD device and the touch key device are separate from each other, and thus the entirety of the LCD apparatus still has four substrates and is excessively thick. Since a polarizer and a reflector need to be added to the four-substrate structure, the apparatus is still thicker.

Japanese Laid-Open Patent Publication No. 1-118819 describes an LCD apparatus using a plastic plate also acting as a phase plate to reduce the thickness of the LCD device.

The plastic substrates used in some of the above-described conventional LCD apparatuses have problems of inferior moisture resistance and air resistance (i.e., resistance against oxygen transmittance). As a solution, the plastic substrate is provided with a hardcoat layer and a gas barrier layer. The provision of such layers complicates the structure and increases the cost, thereby preventing replacement of glass substrates with plastic substrates.

SUMMARY OF THE INVENTION

According to one aspect of the invention, a liquid crystal display apparatus having an input function includes a first substrate, a second substrate, and a third substrate; a display medium provided between the first substrate and the second substrate; a first electrode provided between the first substrate and the display medium; a second electrode provided between the second substrate and the display medium; spacers for supporting the second substrate and the third substrate with respect to each other; and at least two electrodes provided between the second substrate and the third substrate. The display medium includes a polymer projection and a liquid crystal region at least partially surrounded by the polymer projection, and the first, second and third substrates are each formed of a polymer material, at least one of the first, second and third substrates has a polarizing function, and at least one of the first, second and third substrates has a phase contrasting function.

In one embodiment of the invention, at least one of the first, second and third substrates is formed of either one of a polymer film or a lamination of a plurality of polymer films.

In another embodiment of the invention, at least one of the first, second and third substrates has a thickness of about 0.05 mm to about 0.5 mm.

In still another embodiment of the invention, the LCD apparatus further includes a reflection layer provided on the first substrate.

In still another embodiment of the invention, the first substrate includes a polarizing function, the second substrate has a phase contrasting function, and the third substrate has a polarizing function, and the second substrate is formed of either one of a polymer film or a lamination of a plurality of polymer films.

In still another embodiment of the invention, the first substrate includes a polarizing function, and the second substrate has a polarizing function and a phase contrasting function, and the second substrate is formed of either one of a polymer film or a lamination of a plurality of polymer films.

In still another embodiment of the invention, the first substrate includes a polarizing function, and the third substrate has a polarizing function and a phase contrasting function, and the third substrate is formed either one of a polymer film or a lamination of a plurality of polymer films.

In still another embodiment of the invention, the first substrate includes a polarizing function, and the second substrate has a polarizing function and a phase contrasting function.

In still another embodiment of the invention, the second substrate, the third substrate, and an area interposed between the second substrate and the third substrate are included in a data input device operable by either one of a pressure-sensitive system or an electrostatic induction system.

According to another aspect of the invention, a method for producing a liquid crystal display device having an input function, comprising the steps of forming a first substrate, a second substrate and a third substrate; forming a display medium between the first substrate and the second substrate; forming a first electrode between the first substrate and the display medium; forming a second electrode between the second substrate and the display medium, providing spacers between the second substrate and the third substrate; and forming at least two electrodes between the second substrate and the third substrate. The display medium is formed to include a polymer projection and a liquid crystal region at least partially surrounded by the polymer projection, and the first, second and third substrates are each formed of a polymer material, at least one of the first, second and third substrates is formed to have a polarizing function, and at least one of the first, second and third substrates is formed to have a phase contrasting function.

In one embodiment of the invention, the step of forming the display medium includes the steps of injecting a mixture including at least a liquid crystal material, a photopolymerizable resin, and a photoinitiator into a space between the first substrate and the second substrate, and radiating ultraviolet light toward the mixture to phase-separate the mixture into the liquid crystal material and a polymer projection.

In another embodiment of the invention, the step of forming the display medium includes the step of radiating the ultraviolet light through a photomask having a pattern and toward the mixture, the photomask shielding at least the ultraviolet light.

In still another embodiment of the invention, the step of forming the display medium includes the step of radiating the ultraviolet light toward the mixture using at least one of the first electrode and the second electrode as a photomask, the first electrode and the second electrode absorbing the ultraviolet light.

In still another embodiment of the invention, the step of forming the display medium includes the steps of forming the polymer projection over either one of the first substrate or the second substrate, dropping the liquid crystal material to be put over one of the first substrate or the second substrate, and assembling the first substrate and the second substrate.

In still another embodiment of the invention, the method further includes the steps of forming a rugged surface area in a surface of the first substrate by embossing, and forming a reflection layer on the rugged surface area of the first substrate.

According to the present invention, the three substrates used in the LCD apparatus are formed of one polymer film or a lamination of a plurality of polymer films and act as two polarizing plates and a phase plate. One of the substrates can also have a reflection function. The LCD apparatus having an input function of such a structure can be sufficiently thin and sufficiently light-weight. Despite the extreme thinness, the LCD device is rigid and prevented from being deflected in the thickness direction when the data input device is pressed by a pen or the like for data input. Thus, the cell gap of the LCD device is not changed as in a conventional device shown in FIG. 15 which is deflected when pressed with a pen 130 or the like. Such an advantage is achieved by a polymer projection provided in the display medium between the two substrates of the LCD device in addition to the seal for supporting the two substrates with respect to each other. Accordingly, the display by the liquid crystal material is not disturbed, and an image can be displayed precisely in accordance with the input data.

In one embodiment of the invention, the first substrate has a polarizing function, the second substrate has a phase contrasting function, and the third substrate has a polarizing function. In another embodiment of the invention, the first substrate has a polarizing function, and the second substrate has a phase contrasting function and a polarizing function. In these cases, elliptically polarized light transmitted through the liquid crystal layer is converted into linearly polarized light by the second substrate having the phase contrasting function which is substantially in contact with the liquid crystal layer. Thus, the light utilization efficiency is raised, resulting in a higher contrast ratio.

In most conventional LCD apparatuses having an input function, one of two substrates of the LCD device is formed of a thick or rigid glass or acrylic substrate in order to prevent the display from being disturbed by the pressure with a pen or in order to prevent breakage of the LCD device In an embodiment according to the present invention, in which the first substrate has a polarizing function and the third substrate has a phase contrasting function and a polarizing function, the third substrate is sufficiently thick and rigid to replace the glass or acrylic substrate.

In an embodiment in which a reflection layer or plate is provided on the first substrate, the moisture and air (oxygen) which affect the performance of the LCD apparatus can be shielded.

Since the substrates have a polarizing function and a phase contrasting function, a separate polarizing plate or phase plate is not necessary. Accordingly, the problems with a conventional technology incurred by the adhesive used for providing the separate polarizing and phase plates, for example, reduction in yield by invasion of air bubbles and reduction in reliability by quality deterioration of the adhesive by heat and moisture can be solved.

In the case where the first substrate has a reflection function, a rugged surface area for reflecting light is formed in a surface of the first substrate relatively easily by embossing, namely, by forming the polymer material used for the first substrate by heat or light.

The polymer projection in the display medium in the LCD device can be formed by (1) causing, by light, phase separation of the mixture injected into the LCD device into a liquid crystal material and a photopolymerizable material, or (2) patterning the photosensitive resin such as a photoresist by photolithography. By either method, the polymer projection can be formed relatively easily at relatively high yield.

In the case where the polymer projection is formed by phase separation in the structure in which at least one of the first and the second substrates has a polarizing function, UV light can be radiated through the substrate having the polarizing function. This way, the UV light is transmitted only in the polarization direction of the substrate, resulting in polarizing exposure. Thus, molecules of the photopolymerizable resin is aligned in the polarization direction. Therefore, leakage of light through the polymer projection is prevented, thus improving the brightness.

Thus, the invention described herein makes possible the advantages of providing a sufficiently thin, sufficiently light, higher quality LCD apparatus having an input function for (1) preventing generation of defective display when the touch key is pressed for data input, (2) preventing the input point from being offset with respect to the display point due to parallax, and (3) improving the contrast; and (4) a method for producing the same with sufficiently low cost.

These and other advantages of the present invention will become apparent to those skilled in the art upon reading and understanding the following detailed description with reference to the accompanying figures.

BRIEF DESCRIPTION OF THE DRAWINGS

FIGS. 4A through 4D are cross sectional views illustrating steps for producing the LCD apparatus shown in FIG. 3;

DESCRIPTION OF THE PREFERRED EMBODIMENTS

Hereinafter, the present invention will be described by way of illustrative, but non-limiting, examples with reference to the accompanying drawings.

EXAMPLE 1

Figure 1:
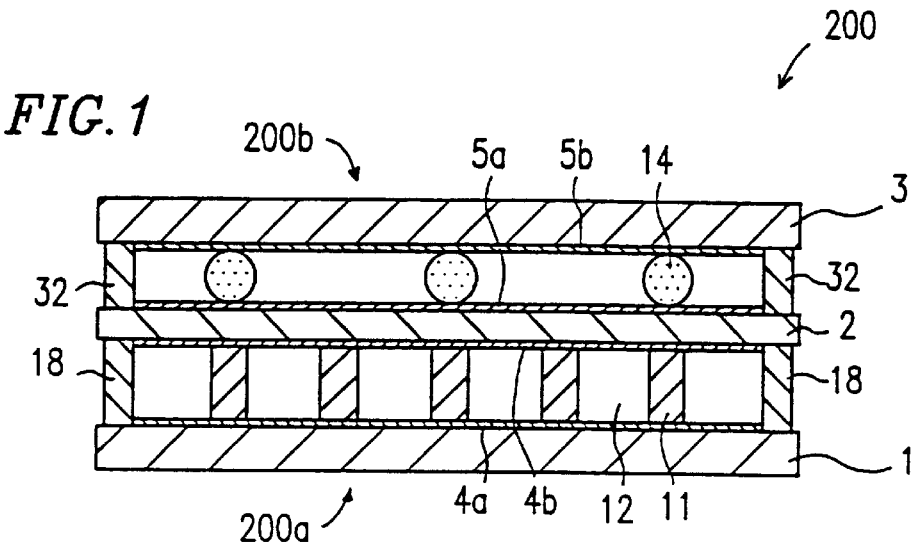
FIG. 1 is a cross sectional view of an LCD apparatus having an input function in a first example according to the present invention.

FIG. 1 is a cross sectional view of an LCD apparatus 200 including an LCD device 200a and a touch key device 200b used for data input (hereinafter, referred to simply as the "LCD apparatus 200") in a first example according to the present invention.

The LCD device 200a includes a first substrate 1 and a second substrate 2. The first substrate 1 has a thickness of, for example, about 0.1 mm to about 1.2 mm and is formed of a polymer material. The polymer material can be, for example, a heat-resistant transparent polymer such as a crosslinked acrylic resin, an epoxy resin, polycarbonate (PC) or polyacrylate. The second substrate 2 includes one polymer film or a lamination of a plurality of polymer films. The polymer films can be formed of, for example, PC, polyethylenesulfone (PES), or polyethyleneterephthalate (PET). Each of the polymer films has a thickness of about 0.05 mm to about 0.5 mm. A transparent electrode 4a used for driving a liquid crystal material is provided in a striped pattern on a surface of the first substrate 1, and a transparent electrode 4b used for driving the liquid crystal material is provided in a striped pattern on a surface of the second substrate 2. The first and the second substrates 1 and 2 are opposed to each other so that the electrodes 4a and 4b are inside and cross each other. Each of intersections acts as a pixel region. In this specification, the term "pixel region" refers to a region which forms a pixel or a display element. The pixel region includes a liquid crystal region interposed between two substrates. Also in this specification, the term "transparent electrode" refers to an electrode which allows visible light to transmit therethrough.

The substrates 1 and 2 are secured to each other by a seal 18 provided between the substrates 1 and 2 along a periphery thereof. The seal 18 is formed of a UV (ultraviolet)-curable sealing resin or a low temperature-curable sealing resin. In a preferred embodiment, the seal 18 is formed of a UV-curable material or a low temperature-curable material. Inside the seal 18, a display medium formed of the liquid crystal material is provided. As the liquid crystal material, any liquid crystal material known in the art can be used. The display medium includes a plurality of liquid crystal regions 12, each of which is partially or totally surrounded by a polymer projection 11. At least one liquid crystal region 12 is provided for each of the pixel regions. The direction of liquid crystal molecules in the at least one liquid crystal region 12 corresponding to each pixel region is adjusted by the level of voltage applied to the electrodes 4a and 4b.

The LCD device 200a further includes alignment layers (not shown) provided on the surfaces of the substrates 1 and 2 which cover the electrodes 4a and 4b. Inside the seal 18, a plurality of spacers (not shown) are provided for controlling the space between the substrates 1 and 2. As necessary, a reflection layer or a reflection plate can be provided on the surface of the first substrate 1 which does not face the second substrate 2. In the case where the reflection layer or plate its provided, the LCD device 200a acts as a reflection-type LCD device. The reflection-type LCD device is combined with the touch key device 200b to form the reflection-type LCD apparatus 200 having an input function. The LCD device 200a in the first example, in which the electrodes 4a and 4b are both provided in a striped pattern, is of a simple matrix type. In an alternative embodiment, the LCD device can be of an active matrix type, in which either the transparent electrode 4a or 4b is provided on the entire substrate and the other electrode is provided in a matrix pattern to act as pixel electrodes. This is the same with all the following examples.

The touch key device 200b includes the second substrate 2 which is also part of the LCD device 200a and a flexible third substrate 3 formed of a polymer material. A transparent electrode 5a used for pressure-sensitive data input is provided on the surface of the second substrate 2 which does not face the first substrate 1. A transparent electrode 5b used for pressure-sensitive data input is provided on a surface of the third substrate 3. The electrodes 5a and 5b are provided on the substantially entire surfaces of the second and third substrates 2 and 3, respectively.

The substrates 2 and 3 are secured to each other by a seal 32 provided between the substrates 2 and 3 along a periphery thereof, so that the electrodes 5a and 5b are inside. The seal 32 is formed of, for example, a UV-curable material or a low temperature-curable material. A plurality of spacers 14 are provided inside the seal 32 for controlling the space between the substrates 2 and 3. As necessary, the above-mentioned hardcoat layer or gas barrier layer can be provided on one surface or both two surfaces of the first and second substrates 1 and 2.

The first substrate 1 formed of a polymer material can have a thickness of, for example, about 0.1 mm to 1.2 mm. The polymer material can be, for example, a heat-resistant transparent polymer such as a crosslinked acrylic resin, an epoxy resin, polycarbonate (PC) or polyacrylate. The second substrate 2 can be formed of at least one polymer film having a thickness of, for example, about 0.05 mm to about 0.5 mm, and can be formed of, for example, PC, polyethylenesulfone (PES), or polyethyleneterephthalate (PET). Since the second substrate 2 is formed of at least one polymer film, the entirety of the LCD apparatus 200 is thinner. Accordingly, the input point is prevented from being offset with respect to the display point due to parallax, and the generation of a double image can be prevented.

As described above, the second substrate 2 can be formed of one polymer film or a lamination of a plurality of polymer films. In the case where the second substrate 2 is formed of a plurality of polymer films, the LCD device 200a and the touch key device 200b can be produced separately and then assembled.

The flexible third substrate 3 can be formed of a polymer film having a polarization function or a polymer film having no polarization function, depending on the kind of liquid crystal material used. The third substrate 3 can be formed of one polymer film or a lamination of a plurality of polymer films. Since the third substrate 3 is formed of at least one polymer film, the entirety of the LCD apparatus 200 is thinner. Accordingly, generation of a double image can be prevented in a wider range of viewing angles.

Figure 2:
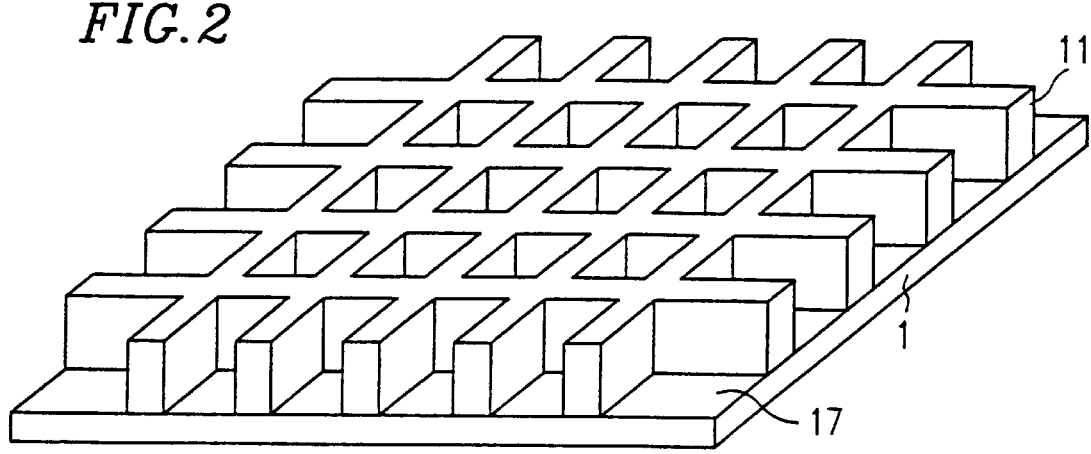
FIG. 2 is an isometric view of a first substrate of the LCD apparatus shown in FIG. 1 having a polymer projection provided thereon.

The polymer projection 11 can be provided in, for example, a mesh (i.e., wall) pattern, in a column pattern, or in a strip pattern. In the mesh pattern, the polymer projection 11 surrounds. each of the pixel regions (indicated with reference numeral 17 in FIG. 2). In the column pattern, the polymer projection 11 is in the form of a plurality of columns at the four outer corners of each pixel region. In the strip pattern, the polymer projection 11 is in the form of a plurality of strips running substantially parallel to each other to interpose each of a plurality of lines of pixel regions. The polymer projection 11 can be produced in, for example, the following two methods.

<Method 1>

After the first and second substrates 1 and 2 are assembled with the seal 18 interposed therebetween, a mixture of a UV-curable material and a liquid crystal material is injected into the space between the two substrates 1 and 2. The UV-curable material can be, for example, a photopolymerizable monomer or oligomer. The mixture can also contain a photoinitiator.

UV light is radiated toward the mixture through a photomask and through the first or the second substrate 1 or 2 to polymerize a part of the UV-curable material irradiated by the UV light. Thus, the phase separation into the liquid crystal material and the polymer material is performed, thereby forming the polymer projection 11. The photomask is patterned so as to allow the UV light to be radiated to a mesh-like, column-like or strip-like area of the mixture, where the polymer projection 11 is to be formed. The UV light running toward the remaining area of the mixture is shielded by the photomask. The polymer projection 11 extends between the alignment layers provided on the first and the second substrates 1 and 2.

The electrodes 4a and 4b formed on the first and the second substrates 1 and 2 can act as a photomask if the electrodes 4a and 4b can shield the UV light having a wavelength of about 365 nm by about 40%. In order to shield such UV light by about 40%, the electrodes 4a and 4b are formed, for example, at a low temperature as described later.

In the case where the LCD device is of an active matrix type and a plurality of pixel electrodes are provided on the first substrate and are reflective, the UV light is radiated through the first substrate. By such a method, the polymer projection 11 can be formed by self-alignment, namely, with no photomask.

<Method 2>

After the electrodes and alignment layers, and the like are formed on the first and the second substrates 1 and 2, a photosensitive resin layer is provided on one of the substrates 1 and 2 and patterned by photolithography including exposure and development, thereby forming the polymer projection 11 in the above-mentioned mesh, column or strip pattern, etc. Next, a liquid crystal material is dropped on the substrate having the polymer projection 11 thereon or the other substrate, and then the two substrates 1 and 2 are assembled with the seal 18 so that the electrodes 4a and 4b are inside. The photosensitive resin can be a photoresist or a photosensitive polyimide. The liquid crystal material can be, for example, an STN, TN (twisted nematic), phase transition guest-host, or ferroelectric liquid crystal material.

After the LCD device 200a is produced as described above, the electrode 5a is formed on the second substrate 2, and the electrode 5b is formed on the third substrate 3. The third substrate 3 is then attached to the LCD device 200a with the seal 32 so that the electrodes 5a and 5b are inside. Thus, the touch key device 200b is produced, and also the LCD apparatus 200 produced.

In this and all the following examples, examples of the liquid crystal material include ZLI-4801-000, ZLI-4801-001, ZLI-4792, and ZLI-4427 which are available from Merck & Co., Inc.

Examples of the polymer material, for example, include monomers such as acrylic acids, acrylic esters having along chain alkyl group containing three or more carbons or an aromatic ring, isobutyl acrylate, stearyl acrylate, lauryl acrylate, isoamyl acrylate, n-butylmethacrylate, n-lauryl methacrylate, tridecyl methacrylate, 2-ethylhexyl acrylate, n-stearyl methacrylate, cyclohexyl methacrylate, benzyl methacrylate, and 2-phenoxyethyl methacrylate.

In order to increase the physical strength of the polymer, multi-functional material with two or more functional groups, such as bisphenol A dimethacrylate, bisphenol A diacrylate, 1,4-butanediol dimethacrylate, 1,6-dimethacrylate, trimethylol propane triacrylate, and tetramethylolmethane tetraacrylate can be used.

Moreover, a polymerizable material obtained by halogenating, in particular, by chlorinating or fluorinating the above-mentioned monomer can be used. Examples of such a polymerizable material include 2,2,3,4,4,4-hexaphlorobutyl methacrylate, 2,2,3,4,4,4-hexachlorobutyl methacrylate, 2,2,3,3-tetraphloropropyl methacrylate, 2,2,3, 3-tetraphloropropyl methacrylate, perphlorooctyl methacrylate, perchlorooctylethyl methacrylate, perphlorooctylethyl acrylate, and perchlorooctylethyl acrylate.

The above-mentioned polymerizable material can be used alone or in combination of two or more. If necessary, chlorinated or fluorinated polymers or oligomers can be mixed with the above-mentioned monomer.

In the case where thin film transistors are used in the LCD apparatus, a polymer which has a specific resistance of $1 \times 10^{12}$ Ω·cm or more even in an uncured state is preferred.

As the photoinitiator, any photoinitiator generally used can be used in the present invention. For example, Irgacure 184, 651 and 907, and Darocur 1173, 1116 and 2959 can be used.

The three substrates 1, 2 and 3 totally include at least one polymer film having a polarizing function and a polymer film having a phase contrasting function.

In the structure where two polymer films each having a polarizing function are provided, the positional relationship among the three polymer films are as follows:

The two polymer films having a polarizing function interpose the display medium therebetween. The polymer film having a phase contrasting function is provided between the two polymer films.

For example, the first substrate 1 includes a polymer film having a polarizing function, the second substrate 2 includes a polymer film having a phase contrasting function, and the third substrate 3 includes a polymer film having a polarizing function.

Alternatively, the first substrate 1 includes a polymer film having a polarizing function, and the second substrate 2 includes a polymer film having a polarizing function and a polymer film having a phase contrasting function. In this structure, the third substrate 3 need not included a polarizing function.

Still alternatively, the first substrate 1 includes a polymer film having a polarizing function and a polymer film having a phase contrasting function, and the second substrate 2 or the third substrate 3 includes a polymer film having a polarizing function.

The first substrate 1 can include a reflection layer or plate.

EXAMPLE 2

Figure 3:
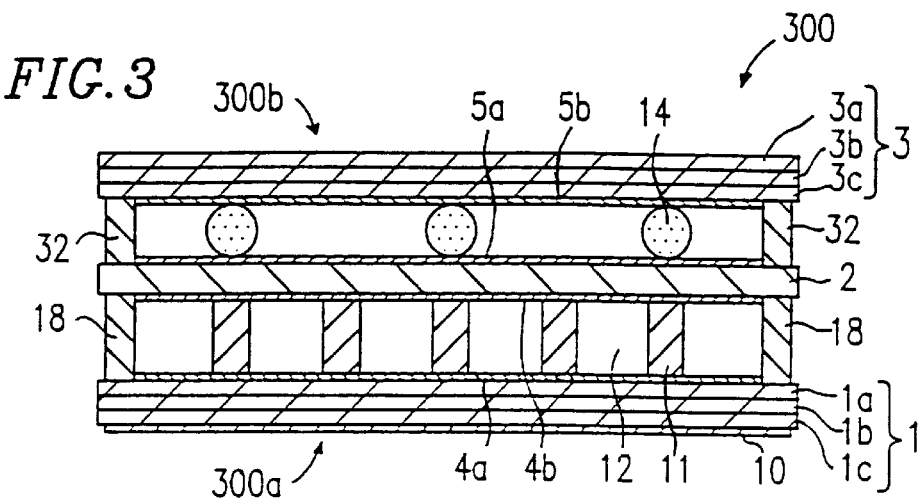
FIG. 3 is a cross sectional view of a reflection-type LCD apparatus having an input function in a second example according to the present invention.

FIG. 3 is a cross sectional view of a reflection-type LCD apparatus 300 having an input function according to a second example of the present invention. The LCD apparatus 300 includes a reflection-type LCD device 300a having a reflection plate 10 and a touch key device 300b.

The LCD apparatus 300 includes first, second and third substrates 1, 2 and 3 opposed to one another. The first and the second substrates 1 and 2 are included in the LCD device 300a, and the second and the third substrates 2 and 3 are included in the touch key device 300b.

The LCD device 300a further includes a seal 18 provided between the substrates 1 and 2 along a periphery thereof and a display medium formed of a liquid crystal material. The display medium includes a plurality of liquid crystal regions 12, each of which is partially or totally surrounded by a polymer projection 11.

The first substrate 1 is formed of at least one polymer film, and a transparent electrode 4a used for the driving liquid crystal material is provided on a surface thereof. The second substrate 2 is formed of a polymer film and is flexible because of being formed of a film, and a transparent electrode 4b used for driving the liquid crystal material is provided on a surface thereof. The first and the second substrates 1 and 2 are opposed to each other so that the electrodes 4a and 4b are inside and cross each other.

On the surface of the second substrate 2 which does not face the first substrate 1, a transparent electrode 5a used for pressure-sensitive data input is provided. The third substrate 3 is formed of at least one polymer film, and a transparent electrode 5b used for pressure-sensitive data input is provided on a surface of the third substrate 3. The third substrate 3 is opposed to the second substrate 2 so that the electrodes 5a and 5b are inside.

The first substrate 1 has a polarizing function, and the second substrate 2 has a phase contrasting function in a planar direction which is perpendicular to the thickness direction (or in the planar and thickness directions as necessary). The third substrate 3 has a polarizing function. The reflection plate 10 is provided on the surface of the first substrate which does not face the second substrate 2.

The LCD apparatus 300 having the above-described structure is preferably produced in the following manner.

The first substrate 1 having a polarizing function is formed of three layers of triacetylcellulose (TAC) layer 1a/polyvinyl alcohol layer 1b (PVA) drawn in one direction and including iodine/PC layer 1c. Each of the layers has a thickness of about 0.05 mm. On a surface of the first substrate 1, the transparent electrode 4a is formed of ITO (indium tin oxide) in a striped pattern. Thereafter, an alignment layer (not shown) is formed thereon.

The second substrate 2 is formed of PC to a thickness of about 0.1 mm end a retardation of about 400 nm in the planar direction. On a surface of the second substrate 2, the transparent electrode 4b of ITO is formed in a striped pattern, and an alignment layer (not shown) is formed thereon. Color compensation is assured by the phase contrast in the planar direction. A wider range of viewing angles can be realized by obtaining a phase contrast in the thickness direction.

The alignment layers on the first and the second substrates 1 and 2 are treated by rubbing so that liquid crystal molecules of the liquid crystal material are twisted at 240° between the first and the second substrates 1 and 2 when the two substrates 1 and 2 are assembled. Then, the two substrates 1 and 2 are assembled with the seal 18 formed of a UV-curable material so that the electrodes 4a and 4b are inside the two substrates 1 and 2.

FIGS. 4A through 4D are cross sectional views illustrating the steps for producing the LCD apparatus 300. As shown in FIG. 4A, a mixture 28 including at least a liquid crystal material, a UV-curable resin, and a photoinitiator is injected into the space between the two substrates 1 and 2. Next, UV light 22 is radiated through a photomask and toward the mixture 28. The photomask is used to control the intensity of the UV light radiated to different areas of the mixture 28. The photomask 16 can be provided on the surface of the second substrate 2 which does not face to the first substrate 1 as indicated by reference numeral 16 in FIG. 4B, or the electrodes 4a and 4b formed of ITO can each be used as a photomask as shown in FIG. 4C. In the second example, the photomask 16 is provided as shown in FIG. 4B.

Due to the radiation of UV light, the mixture 28 is phage-separated into the liquid crystal material and the resin cured by the UV light. It is preferable to radiate the UV light 22 at such a temperature as to put the mixture 28 into an isotropic liquid state and then gradually cool the mixture 28 down to room temperature in order to obtain clearer phase separation. The resin cured by the UV light acts as a polymer projection 11 surrounding a plurality of liquid crystal regions 12. In the liquid crystal regions 12, the liquid crystal molecules are aligned in a desired direction.

Next, the third substrate 3 having a polarizing function is formed of three layers of TAC layer 3a/PVA layer 3b drawn in one direction and including iodine/PC layer 3c. Each of the layers has a thickness of about 0.15 mm. On a PC surface of the third substrate 3, the transparent electrode 5b is formed of ITO. On the surface of the second substrate 2 which does not face the first substrate 1, the transparent electrode 5a is formed of ITO.

The second substrate 2 and the third substrate 3 are assembled with a seal 32 so that the transparent electrodes 5a and 5b are inside, thereby forming the touch key device 300b. The seal 32 is formed of a UV-curable material or a low temperature-curable material.

Then the reflection plate 10 is formed on the surface of the first substrate 1 which does not face the second substrate 2. Thus, the LCD apparatus 300 shown in FIG. 3 including the LCD device 300a and the touch key device 300b is produced.

The LCD apparatus 300 produced in this manner has the following advantages among others:

The polymer projection 11 prevents the second substrate 2 of the LCD device 300a from being deformed by the pressure applied when the touch key device 300b is pressed by a pen for data input. Thus, the cell thickness is maintained, and therefore the retardation of the liquid crystal regions 12 is maintained. Accordingly, a change of the color into an undesirable color is prevented.

Since the three substrates 1, 2 and 3 act as two polarizing plates and a phase plate, separate polarizing plates or phase plate are not required. Accordingly, the thickness of the LCD apparatus 300 is reduced and the production method is simplified.

Due to the sufficiently thin LCD apparatus 300, the input point is prevented from being offset with respect to the display point due to parallax, and the generation of a double image can be prevented in a wider range of viewing angles. Thus, the LCD apparatus 300 is sufficiently easy to operate, and a contrast ratio of 9 is obtained.

EXAMPLE 3

Figure 5:
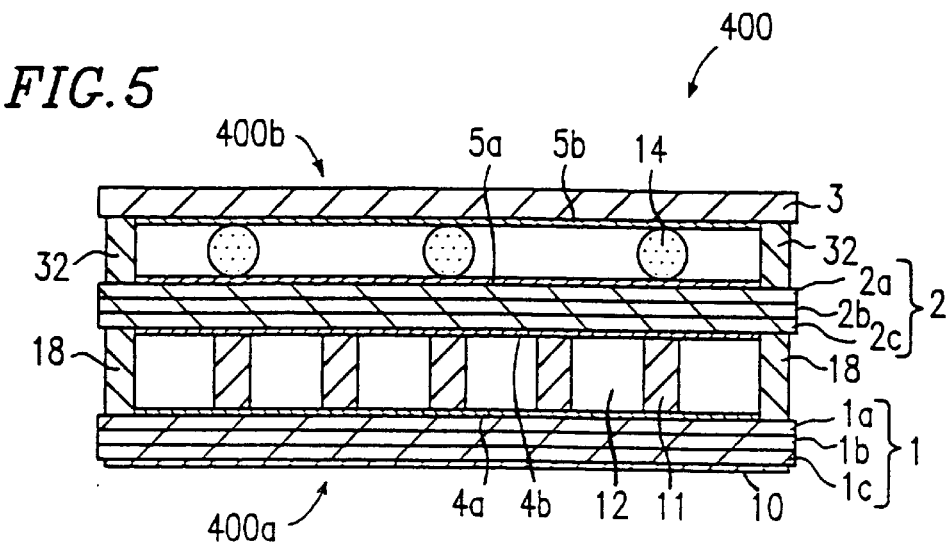
FIG. 5 is a cross sectional view of a reflection-type LCD apparatus having an input function in a third example according to the present invention.

FIG. 5 is a cross sectional view of a reflection-type LCD apparatus 400 having an input function according to a third example of the present invention. The LCD apparatus 400 includes a reflection-type LCD device 400a having a reflection plate 10 and a touch key device 400b.

The LCD apparatus 400 includes first, second and third substrates 1, 2 and 3 opposed to one another. The first and the second substrates 1 and 2 are included in the LCD device 400a, and the second and the third substrates 2 and 3 are included in the touch key device 400b.

The LCD device 400a further includes a seal 18 provided between the substrates 1 and 2 along a periphery thereof and a display medium formed of a liquid crystal material. The display medium includes a plurality of liquid crystal regions 12, each of which is partially or totally surrounded by a polymer projection 11.

The first substrate 1 is formed of a polymer material, and a transparent electrode 4a used for driving a liquid crystal material is provided on a surface thereof. The second substrate 2 is a flexible substrate formed of at least one polymer film, and a transparent electrode 4b used for driving the liquid crystal material is provided on a surface thereof. The first and the second substrates 1 and 2 are opposed to each other so that with the electrodes 4a and 4b inside and cross each other.

On the surface of the second substrate 2 which does not face the first substrate 1, a transparent electrode 5a used for pressure-sensitive data input is provided. The third substrate 3 is formed of a polymer material, and a transparent electrode 5b used for pressure-sensitive data input is provided on a surface of the third substrate 3. The third substrate 3 is opposed to the second substrate 2 so that the electrodes 5a and 5b are inside.

The first substrate 1 has a polarizing function, and the second substrate 2 has a polarizing function and a phase contrasting function in the planar direction (or in the planar and thickness directions as necessary). A reflection plate 10 is provided on the surface of the first substrate which does not face the second substrate 2.

The LCD apparatus 400 having the above-described structure is preferably produced in the following manner.

The first substrate 1 having a polarizing function is formed of three layers of TAC layer 1a/PVA layer 1b drawn in one direction and including iodine/PC layer 1c. Each of the layers has a thickness of about 0.05 mm. On a TAC surface of the first substrate 1, the transparent electrode 4a is formed of ITO in a striped pattern at a temperature of about 100° C. Then, an alignment layer (not shown) is formed thereon.

The second substrate 2 having a polarizing function and a phase contrasting function is formed of three layers of TAC layer 2a/PVA layer 2b drawn in one direction and including iodine/PC layer 2c. The second substrate 2 having the three layers has a total thickness of about 1.0 mm. The PC layer 2c acts as the phase plate having a retardation of about 400 nm in the planar direction. On a PC surface of the second substrate 2, the transparent electrode 4b is formed of ITO in a striped pattern at a temperature of about 100° C. An alignment layer (not shown) is formed thereon.

The alignment layers on the first and the second substrates 1 and 2 are treated by rubbing so that liquid crystal molecules of the liquid crystal material are twisted at 240° between the first and the second substrates 1 and 2 when the two substrates 1 and 2 are assembled. Then, the two substrates 1 and 2 are assembled with the seal 18 formed of a UV-curable material so that the electrodes 4a and 4b are inside the two substrates 1 and 2 and cross each other.

As shown in FIG. 4A, a mixture 28 including at least a liquid crystal material, a UV-curable resin, and a photoinitiator is injected into the space between the two substrates 1 and 2. Next, UV light 22 is radiated through a photomask and toward the mixture 28. In the third example, the electrodes 4a and 4b formed of ITO are each used as a photomask as shown in FIG. 4C. The reason is that the electrodes 4a and 4b are formed at a low temperature of around 100° C. and thus absorb UV light relatively easily. The UV light 22 is radiated in two directions, i.e., through both the first and the second substrates 1 and 2.

Due to the radiation of UV light, the mixture 28 is phase-separated into the liquid crystal material and the resin cured by the UV light. It is preferable to radiate the UV light 22 at such a temperature as to put is the mixture 28 into an isotropic liquid state and then gradually cool the mixture 28 down to room temperature at a rate of 3° C. to 10° C. per hour. It is also preferable to radiate the UV light again after the temperature is decreased. This way, the degree of crosslinking of the polymer molecules is raised, thereby promoting the polymerization. The resin cured by the UV light acts as a polymer projection 11 surrounding a plurality of liquid crystal regions 12.

Next, the third substrate 3 is formed of PC to a thickness of about 0.1 mm. On a surface of the third substrate 3, the transparent electrode 5b is formed of ITO. On the surface of the second substrate 2 which does not face the first substrate 1, the transparent electrode 5a is formed of ITO.

The second substrate 2 and the third substrate 3 are assembled with a seal 32 so that the transparent electrodes 5a and 5b are inside, thereby forming the touch key device 400b. The seal 32 is formed of a UV-curable material or a low temperature-curable material.

Then, the reflection plate 10 is formed on the surface of the first substrate 1 which does not face the second substrate 2. Thus, the LCD apparatus 400 shown in FIG. 5 including the LCD device 400a and the touch key device 400b is produced.

The LCD apparatus 400 produced in this manner has the following advantages among others:

The polymer projection 11 prevents the second substrate 2 of the LCD device 400a from being deformed by the pressure applied when the touch key device 400b is pressed by a pen for data input. Thus, the cell thickness is maintained, and therefore the retardation of the liquid crystal regions 12 is maintained. Accordingly, a change of the color into an undesirable color is prevented.

Since the substrates 1 and 2 act as two polarizing plates and a phase contrasting plate, separate polarizing plates or phase plate are not required. Accordingly, the thickness of the LCD apparatus 400 is reduced and the production method is simplified.

Due to the sufficiently thin LCD apparatus 400, the input point is prevented from being offset with respect to the display point due to parallax, and the generation of a double image can be prevented in a wider range of viewing angles. Thus, the LCD apparatus 400 is sufficiently easy to operate. The distance between the touch key device 400b and the LCD device 400a, namely, the width of the second substrate 2, is the same as that of the LCD apparatus 300 in the second example. Thus, the LCD apparatus 400 has the same visibility as that of the LCD apparatus 300. A contrast ratio of 9.5 is obtained.

EXAMPLE 4

Figure 6:
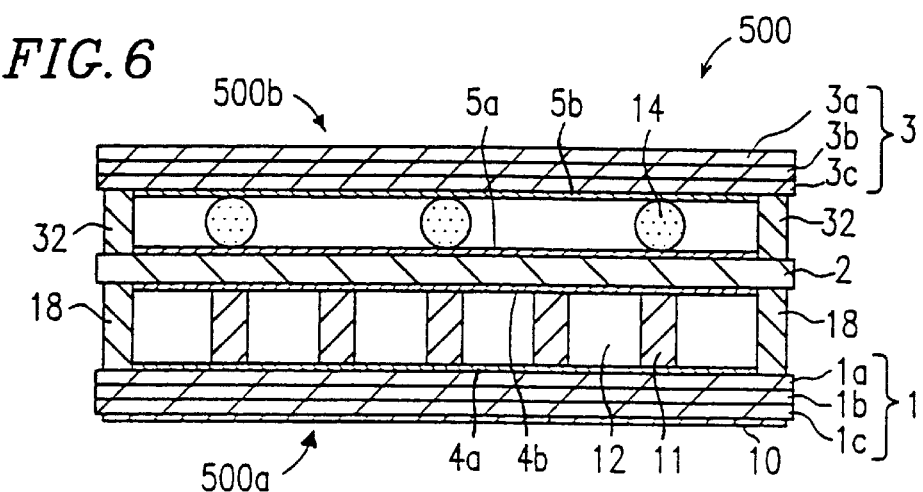
FIG. 6 is a cross sectional view of a reflection-type LCD apparatus having an input function in a fourth example according to the present invention.

FIG. 6 is a cross sectional view of a reflection-type LCD apparatus 500 according to a fourth example of the present invention. The LCD apparatus 500 includes a reflection-type LCD device 500a having a reflection plate 10 and a touch key device 500b.

The LCD apparatus 500 includes first, second and third substrates 1, 2 and 3 opposed to one another. The first and the second substrates 1 and 2 are included in the LCD device 500a, and the second and the third substrates 2 and 3 are included in the touch key device 500b.

The LCD device 500a further includes a seal 18 provided between the substrates 1 and 2 along a periphery thereof and a display medium formed of a liquid crystal material. The display medium includes a plurality of liquid crystal regions 12, each of which is partially or totally surrounded by a polymer projection 11.

The first substrate 1 is formed of at least one polymer film, and a transparent electrode 4a used for driving a liquid crystal material is provided on a surface. The second substrate 2 is formed of a polymer film and is flexible because of being formed of a film, and a transparent electrode 4b used for driving the liquid crystal material is provided on a surface thereof. The first and the second substrates 1 and 2 are secured to each other so that the electrodes 4a and 4b are inside and cross each other.

On the surface of the second substrate 2 which does not face the first substrate 1, a transparent electrode 5a used for pressure-sensitive data input is provided. The third substrate 3 is formed of at least one polymer film, and a transparent electrode 5b used for pressure-sensitive data input is provided on a surface of the third substrate 3. The third substrate 3 is opposed to the second substrate 2 so that the electrodes 5a and 5b are inside.

The first substrate 1 has a polarizing function, and the third substrate 3 has a polarizing function and a phase contrasting function in the planar direction (or in the planar and thickness directions as necessary). A reflection plate 10 is provided on the surface of the first substrate which does not face the second substrate 2.

The LCD apparatus 500 having the above-described structure is preferably produced in the following manner.

The first substrate 1 having a polarizing function is formed of three layers of TAC layer 1a/PVA layer 1b drawn in one direction and including iodine/PC layer 1c. Each of the layers has a thickness of about 0.05 mm. On a TAC surface of the first substrate 1, the transparent electrode 4a is formed of ITO in a striped pattern. Then, an alignment layer (not shown) is formed thereon.

The second substrate 2 is formed of PC to a thickness of about 0.1 mm. On a surface of the second substrate 2, the transparent electrode 4b is formed of ITO in a striped pattern. An alignment layer (not shown) is formed thereon.

The alignment layers on the first and the second substrates 1 and 2 are treated by rubbing so that the liquid crystal molecules of the liquid crystal material are twisted at 240° between the first and the second substrates 1 and 2 when the two substrates 1 and 2 are assembled. Then, the two substrates 1 and 2 are assembled with the seal 18 formed of a UV-curable material or the low temperature-curable resin so that the electrodes 4a and 4b are inside the two substrates 1 and 2 and cross each other.

As shown in FIG. 4A, a mixture 28 including at least a liquid crystal material, a UV-curable resin, and a photoinitiator is injected into the space between the two substrates 1 and 2. Next, UV light 22 is radiated through a photomask and toward the mixture 28. In the fourth example, the electrodes 4a and 4b formed of ITO are each used as a photomask as shown in FIG. 4C. The radiation is performed in two directions, i.e., through both the substrates 1 and 2 simultaneously or alternately.

Due to the radiation of UV light, the mixture 28 is phase-separated into the liquid crystal material and the resin cured by the UV light, The UV light 22 is radiated at such a temperature as to put the mixture 28 into an isotropic liquid state and then the mixture 28 is gradually cooled down to room temperature at a rate of about 5° C. per hour. After the temperature is decreased, the UV light 22 is again radiated toward the mixture 28 to improve the degree of crosslinking of the polymer molecules. The resin cured by the UV light acts as a polymer projection 11 surrounding a plurality of liquid crystal regions 12.

Next, the third substrate 3 having a polarizing function and a phase contrasting function is formed of three layers of TAC layer 3a/PVA layer 3b drawn in one direction and including iodine/PC layer 3c. Each of the layers has a thickness of about 0.25 mm. The PC layer 3c acts as the phase plate having a retardation of about 400 nm in the planar direction. On a PC surface of the third substrate 3, the transparent electrode 5b is formed of ITO. On the surface of the second substrate 2 which does not face the first substrate 1, the transparent electrode 5a is formed of ITO.

The second substrate 2 and the third substrate 3 are assembled with e seal 32 so that the transparent electrodes 5a and 5b are inside, thereby forming the touch key device 500b. The seal 32 is formed of a UV-curable material or a low temperature-curable material.

Then, the reflection plate 10 is formed on the surface of the first substrate 1 which does not face the second substrate 2. Thus, the LCD apparatus 500 shown in FIG. 6 including the LCD device 500a and the touch key device 500b is produced.

The LCD apparatus 500 produced in this manner has the following advantages among others:

The polymer projection 11 prevents the second substrate 2 of the LCD device 500a from being deformed by the pressure applied when the touch key device 500b is pressed by a pen for data input. Thus, the cell thickness is maintained, and therefore the retardation of the liquid crystal regions 12 is maintained. Accordingly, a change of the color into an undesirable color is prevented.

Since the substrates 1 and 3 act as two polarizing plates and a phase contrasting plate, separate polarizing plates or phase plate are not required. Accordingly, the thickness of the LCD apparatus 500 is reduced and the production method is simplified.

Due to the sufficiently thin LCD apparatus 500, the input point is prevented from being offset with respect to the display point due to parallax, and the generation of a double image can be prevented in a wider range of viewing angles. Thus, the LCD apparatus 500 is sufficiently easy to operate, and a contrast ratio of 7.5 is obtained.

Japanese Laid-Open Patent Publication No. 6-262630 discusses that "in the case where the third substrate includes a polarizing film and a polymer film having a phase contrast in the planar direction laminated together, the rigidity of the third substrate is increased, thus deteriorating the resolution of the touch key device". Hereinafter, this disclosure will be discussed. Due to experiments performed by the present inventors, depending on the thickness, the third substrate as described above can be excessively rigid and have an inferior resolution. In the case where the thickness of the third substrate is more than 0.3 mm, the planar area of the third substrate which deflects becomes larger, resulting in an inferior resolution. As long as thickness of the third substrate is 0.3 mm or less as in the second through fourth examples, the touch key device can sufficiently recognize the input data satisfactorily.

The contrast ratios of the LCD apparatuses in the second through fourth examples are shown in Table 1.

TABLE 1

|  | The second substrate acts as a phase plate. | | The second substrate does not act as a phase plate. |
| --- | --- | --- | --- |
|  | Example 2 | Example 3 | Example 4 |
| Contrast ratio | 9 | 9.5 | 7 |

AS can be appreciated from Table 1, in an LCD apparatus in which the second substrate 2, which is provided immediately on top of the liquid crystal layer, has a phase contrasting function, the contrast ratio is higher than in an LCD apparatus in which the third substrate has a phase contrasting function instead of the second substrate. The reason for the higher ratio is that the light utilization efficiency is higher in the former than in the latter.

EXAMPLE 5

Figure 7:
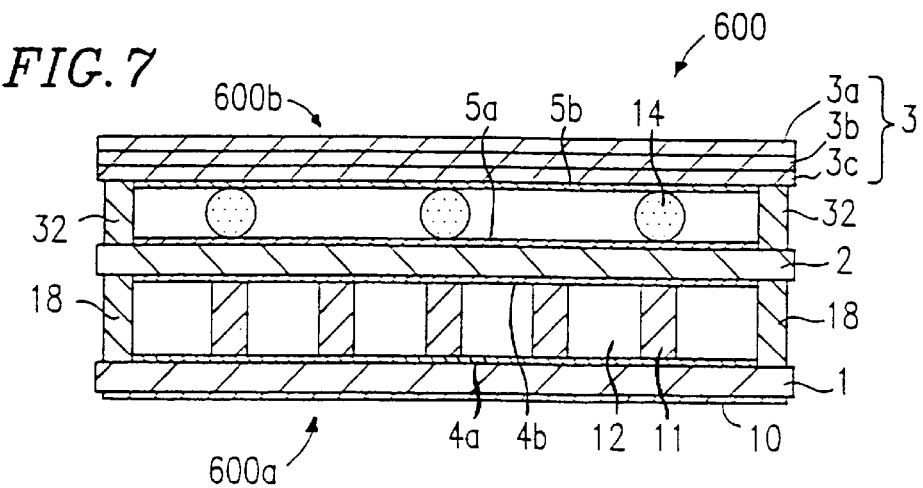
FIG. 7 is a cross sectional view of a reflection-type LCD apparatus having an input function in a fifth example according to the present invention.

FIG. 7 is a cross sectional view of a reflection-type LCD apparatus 600 having an input function according to a fifth example of the present invention. The LCD apparatus 600 includes an LCD device 600a and a touch key device 600b. In the LCD apparatus 600, only the third substrate 3 has a polarizing function and a phase contrasting function. Aside from the fact that the first substrate 1 does not have a polarizing function, the LCD apparatus 600 has the same structure as that of the LCD apparatus 500 in the fourth example.

The LCD apparatus 600 is preferably produced in the following manner.

The first substrate 1 is formed of PC to a thickness of about 0.1 mm. On the first substrate 1, a transparent electrode 4a used for driving a liquid crystal material is formed of ITO in a striped pattern. Then, an alignment layer (not shown) is formed thereon.

A second substrate 2 is formed of PC to a thickness of about 0.1 mm. On a surface of the second substrate 2, a transparent electrode 4b used for driving the liquid crystal material is formed of ITO in a striped pattern. An alignment layer (not shown) is formed thereon.

The alignment layers on the first and the second substrates 1 and 2 are treated by rubbing so that the liquid crystal molecules of the liquid crystal material are twisted at 240° between the first and the second substrates 1 and 2 when the two substrates 1 and 2 are assembled. Then, the two substrates 1 and 2 are assembled with a seal 18 formed of a UV-curable material or a low temperature-curable material so that the electrodes 4a and 4b are inside the two substrates 1 and 2 and cross each other.

As shown in FIG. 4A, a mixture 28 including at least a liquid crystal material, a UV-curable resin, and a photoinitiator is injected into the space between the two substrates 1 and 2. Next, UV light 22 is radiated through a photomask and toward the mixture 28. In the fifth example, the electrodes 4a and 4b formed of ITO are each used as a photomask as shown in FIG. 4C. The radiation is performed in two directions, i.e., through both the substrates 1 and 2 simultaneously or alternately.

Due to the radiation of UV light, the mixture 28 is phase-separated into the liquid crystal material and the resin cured by the UV light. The UV light 22 is radiated at such a temperature as to put the mixture 28 into an isotropic liquid state and then the mixture 28 is gradually cooled down to room temperature at a rate of about 5° C. per hour. After the temperature is decreased, the UV light 22 is again radiated toward the mixture 28 to improve the degree of crosslinking of the polymer molecules. The resin cured by the UV light acts as a polymer projection 11 surrounding a plurality of liquid crystal regions 12.

Next, the third substrate 3 having a polarizing function and a phase contrasting function is formed of three layers of TAC layer 3a/PVA layer 3b drawn in one direction and including iodine/PC layer 3c. The PC layer 3c acts as the phase plate having a retardation of about 400 nm in the planar direction. On a PC surface of the third substrate 3, a transparent electrode 5b used for pressure-sensitive data input is formed of ITO. On the surface of the second substrate 2 which does not face the first substrate 1, a transparent electrode 5a used for pressure-sensitive data input is formed of ITC.

The second substrate 2 and the third substrate 3 are assembled with a seal 32 so that the transparent electrodes 5a and 5b are inside, thereby forming the touch key device 600b. The seal 32 is formed of a UV-curable material or a low temperature-curable material.

Next, a reflection plate 10 is formed on the surface of the first substrate 1 which does not face the second substrate 2. Thus, the LCD apparatus 600 shown in FIG. 7 including the LCD device 600a and the touch key device 600b is produced.

The LCD apparatus 600 produced in this manner has the following advantages among others.

Since the number of polarizing plates is one less than the LCD apparatuses 300, 400 and 500 in the second through fourth examples, the LCD apparatus 600 is thinner than these LCD apparatuses.

The polymer projection 11 prevents the second substrate 2 of the LCD device 600a from being deformed by the pressure applied when the touch key device 600b is pressed by a pen for data input. Thus, the cell thickness is maintained, and therefore the retardation of the liquid crystal regions 12 is maintained. Accordingly, a change of the color into an undesirable color is prevented.

Due to the sufficiently thin LCD apparatus 600, the input point is prevented from being offset with respect to the display point due to parallax, and the generation of a double image can be prevented in a wider range of viewing angles. Thus, the LCD apparatus 600 is sufficiently easy to operate.

Figure 8:
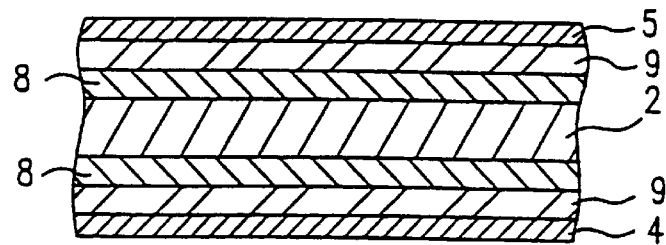
FIG. 8 is a cross sectional view of a polymer substrate usable in the LCD apparatuses shown in FIGS. 1, 3, 5, 6, 7 and 10, the substrate being coated with a silica-type hardcoat and a gas barrier layer.

In the first through fifth examples and also in the following sixth and seventh examples, it is preferable to coat the polymer substrates with, for example, a silica-type hardcoat 9 (FIG. 8) having a thickness of 1 μm, in order to improve the adhesion between the polymer substrates and the electrodes. The adhesion of a polymer substrate with respect to the material for electrodes is weaker than that of a glass substrate. In the case where a reflection plate or a reflection layer is not provided on the first substrate, the first substrate is preferably coated with a gas barrier layer 8 (FIG. 8) formed of, for example, a thin PVA film having a thickness of 2 μm. Such a thin film is provided in order to prevent gas such as oxygen or moisture, which can adversely affect the liquid crystal material, from invading through the substrate. The hardcoat 9 and the gas barrier layer 8 are preferably provided on each of the two surfaces of the first substrate 1. In FIG. 8, reference numerals 4 and 5 each denote an electrode.

EXAMPLE 6

A sixth example according to the present invention relates to a method for producing an LCD apparatus, including an LCD device and a touch key device. The method in the six example will be described with reference to FIGS. 9A and 9B.

Figure 9A:
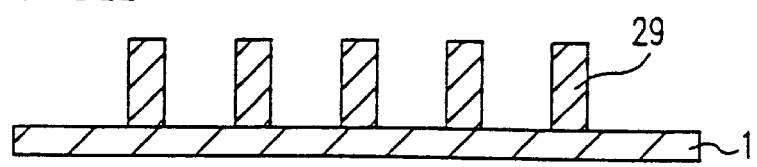
FIGS. 9A and 9B are cross sectional views illustrating steps for producing an LCD apparatus in a sixth example according to the present invention.
Figure 9B:
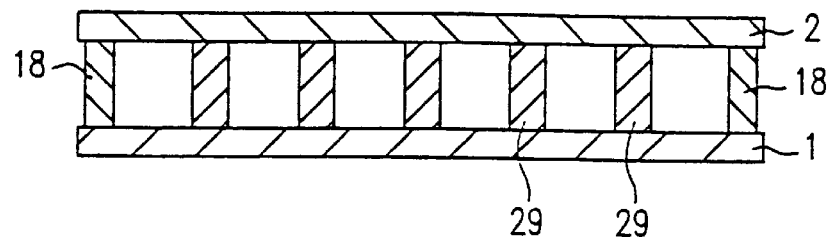

As in the first through fifth examples, an electrode and an alignment layer are formed on a first substrate 1 and another electrode and another alignment layer are formed on a second substrate 2. Over the electrode on the first substrate 1 or on the second substrate 2, a photosensitive resin layer such as a photoresist layer is formed by spin coating or the like, and a polymer projection 29 as shown in FIG. 9A is formed in the above-mentioned mesh, column, or strip pattern, etc. by photolithography including exposure and development. The height of the polymer projection 29 corresponds to the cell gap between the first and the second substrates 1 and 2 when the two substrates 1 and 2 are assembled as shown in FIG. 9B.

In order to obtain a cell gap which is closer to the designed size, a photosensitive resin layer including plastic spacers or the like having a diameter corresponding to the designed cell gap can be formed on one of the substrates.

A liquid crystal material is dropped to be put over the substrate having the polymer projection 29, and then the substrate is assembled with the other substrate with a seal 18. The other substrate is sufficiently pressed to be put into contact with the polymer projection 29. In this manner, the LCD device including the polymer projection 29 formed of a photosensitive resin between the two substrates 1 and 2 is produced.

The touch key device is produced in one of the methods described in the second through fifth examples. The LCD device and the touch key device are assembled to produce the LCD apparatus.

EXAMPLE 7

Figure 10:
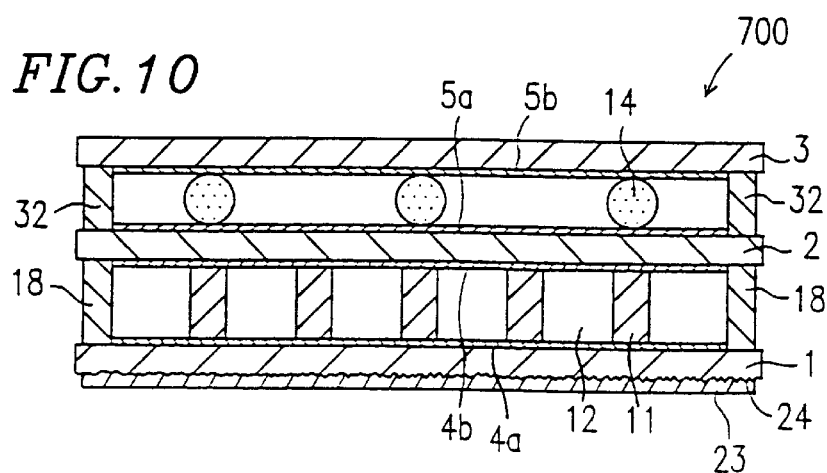
FIG. 10 is a cross sectional view of an LCD apparatus having an input function in a seventh example according to the present invention.

FIG. 10 is a cross sectional view of an LCD apparatus 700 having an input function according to a seventh example of the present invention. The LCD apparatus 700 includes an LCD device 700a and a touch key device 700b. In the seventh example, a first substrate 1 of the LCD device 700a has a polarizing function and a reflection function.

The LCD apparatus 700 is preferably produced in the following manner.

Figure 11A:
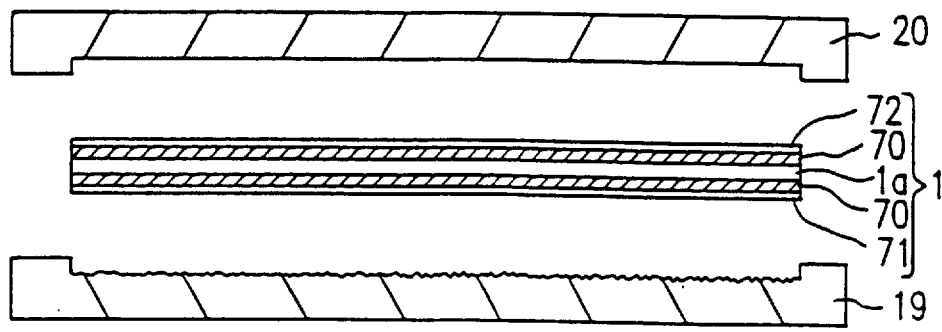
FIGS. 11A and 11B are cross sectional views illustrating a method for producing a first substrate of the LCD apparatus shown in FIG. 10.

The first substrate 1 is formed in the following manner. A polarizer 1a is formed of PVA drawn in one direction and including iodine. Then, as shown in FIG. 11A, a protection layer 70 is provided on each of two surfaces of the polarizer 1a. A TAC layer 72 is formed on one of the protection layers 70, and a PC layer 71 is formed on the other protection layer 70.

Figure 11B:
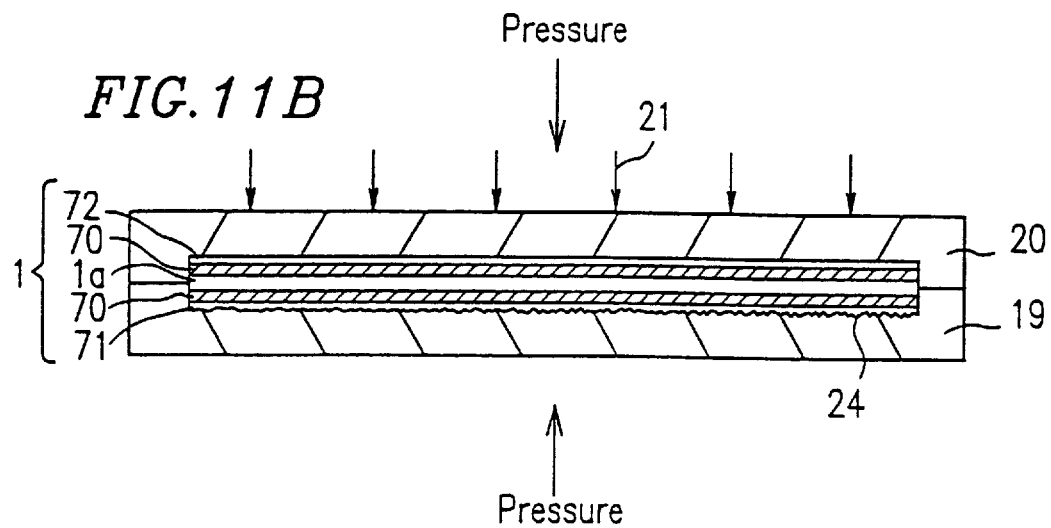

Then, a glass substrate 19 having a rugged surface and another glass substrate 20 having a flat surface are respectively provided on the two surfaces of the resultant lamination. Then, as shown in FIG. 11B, a pressure is applied to the glass substrates 19 and 20. The resultant lamination is heated to form a rugged surface area 24 on one or both two surfaces of the first substrate 1. Namely, the rugged surface area 24 is formed by embossing. In this example, the surface of the TAC layer 72 is flat, and the rugged surface area 24 is formed on the surface of the PC layer 71.

After the glass substrates 19 and 20 are removed, a reflection layer 23 (FIG. 10) is formed of a metal such as aluminum or silver on the rugged surface area 24 of the first substrate 1 to a thickness of 100 nm to 400 nm. The first substrate 1 produced in this manner has a satisfactorily thin thickness.

The second substrate 2 and the third substrate 3 are formed in the manner described in one of the second through fifth examples. By combining these substrates and the other elements, the LCD apparatus 700 shown in FIG. 10 having a reflection layer 23 in lieu of the reflection plate 10 shown in FIGS. 3, 5, 6 and 7 is produced in a simple manner. The LCD apparatus 700 is also sufficiently light-weight. The reflection layer 23 can be formed after the LCD device 700a is produced as well as before the LCD device 700a is produced as described above.

A touch key device usable in an LCD apparatus according to the present invention can be of a pressure-sensitive system or of an electrostatic induction system. According to the pressure-sensitive system, two transparent sheets having a uniform planar resistance face each other with a certain space interposed therebetween. By pressing a point in one of the sheets with a pen or the like, a change in resistance is recognized. Thus, the input point is determined. In the second through fifth examples, this system is used.

Figure 12A:
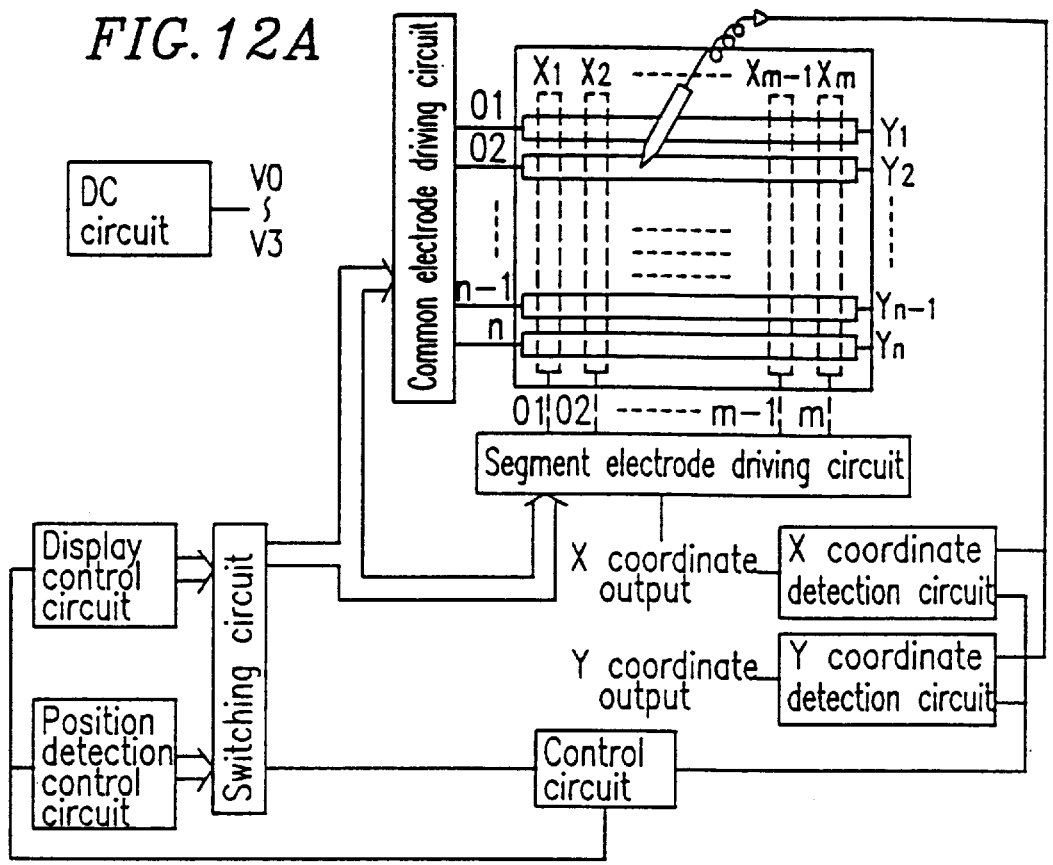
FIG. 12A is a circuit diagram of a touch key device of an electrostatic induction system.
Figure 12B:
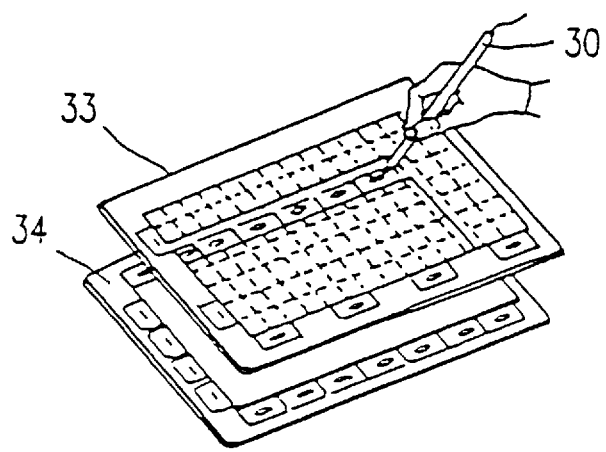
FIG. 12B is an isometric view of a tablet usable for the touch key device of the electrostatic induction system and an LCD panel usable with such a tablet.
Figure 13:
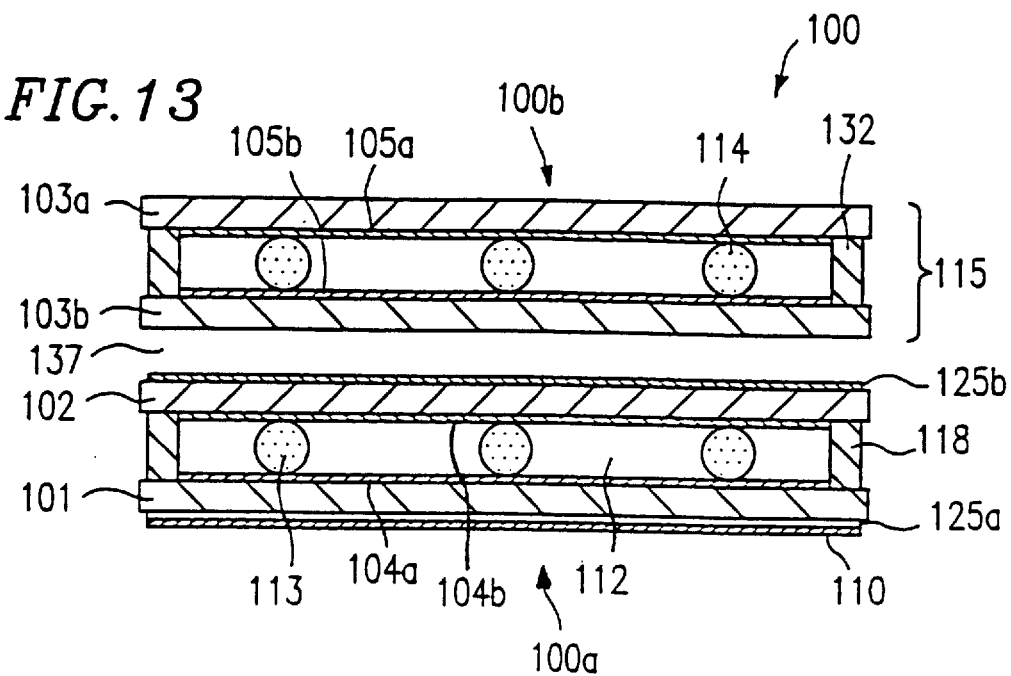
FIG. 13 is a cross sectional view of a conventional reflection-type LCD apparatus.
Figure 14:
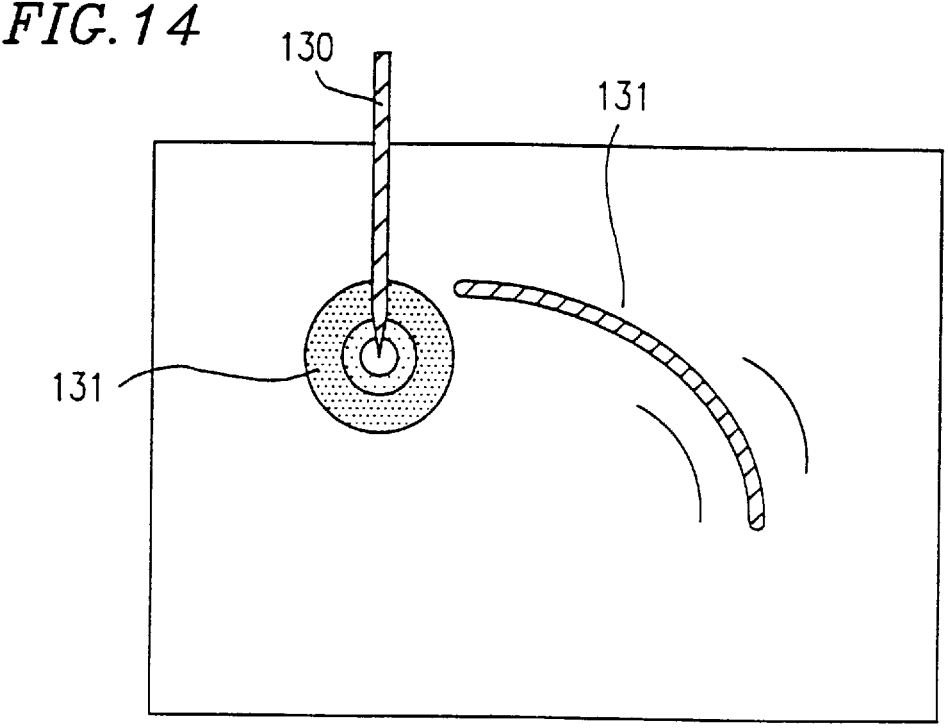
FIG. 14 is a plan view illustrating defective display of a conventional touch key device.
Figure 15:
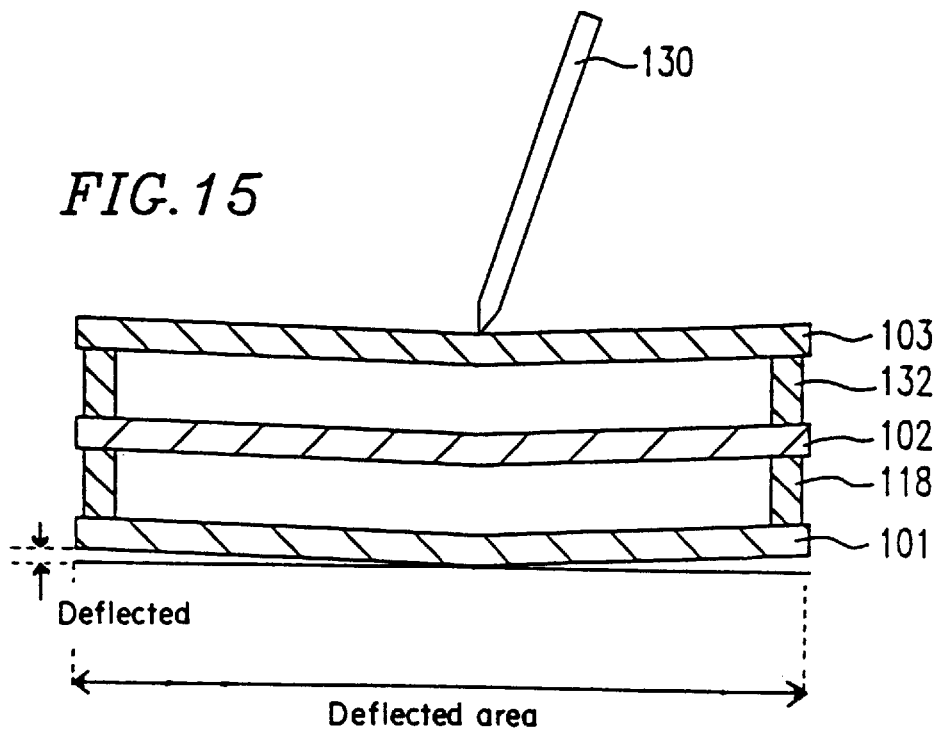
FIG. 15 is a cross sectional view of a conventional touch key device which is deflected when pressed by a pen.

FIG. 12A is a circuit diagram of a touch key device of the electrostatic induction system. FIG. 12B shows a tablet 33 used for the touch key of the electrostatic induction system and an LCD panel 34 usable with such a touch key device. A voltage for detecting an input position is applied to the LCD panel 34, and the input position is detected by the electrostatic coupling of an electrode of the tablet 33 pressed by an input pen 30 and an electrode in the LCD panel 34 corresponding to the electrode of the tablet 33 pressed by the input pen 30.

In the first through seventh examples, the polymer projection 11 or 29 is provided for each of the pixel regions. Alternatively, the polymer projection 11 or 29 can be provided for each of picture elements. The term "picture element" refers to a basic unit for forming an image in an LCD device. In the case where a pixel region bordered by a black matrix or the like is divided into a plurality of smaller regions for processing or other purposes, each of the smaller regions is referred to as a picture element. In the case of a color display, each of regions included in one pixel region, for displaying a red, green or blue image, is referred to as a picture element.

According to the present invention, the LCD device of the LCD apparatus is more rigid than that of the conventional LCD apparatus due to the polymer projection. Thus, the LCD device is not deformed by the pressure applied on the touch key device, thus preventing a change of the color into an undesirable color. As a result, clear images with a sufficiently high resolution are displayed.

In the case where the third substrate has a polarizing function and a phase contrasting function, the pressure applied on the LCD device by the pen or impact can be alleviated. Such an LCD device is sufficiently rigid when used as a terminal device. Due to such a rigid structure, the peripheral circuits can be protected.

According to the present invention, the three substrates are each formed of one polymer film or a plurality of polymer films. The second film is included both in the LCD device and the touch key device. Thus, the LCD apparatus is sufficiently thin. Due to the extreme thinness, the input point is prevented from being offset with respect to the display point due to parallax, and the generation of a double image can be prevented. Since all the substrates are formed of a polymer material, the LCD apparatus is sufficiently light.

In the case where only one of the substrates has a polarizing function, the LCD apparatus is thinner and more light-weight.

In the case where the substrate immediately above the display medium has a phase contrasting function, the utilization efficiency of the reflected light is improved, thus raising the contrast ratio.

In the case where a reflection layer or plate is provided on the first substrate, the moisture and air (oxygen) which affect the performance of the LCD apparatus can be shielded.

Since the substrates have a polarizing function and a phase contrasting function, a separate polarizing plate or phase plate is not necessary. Accordingly, the problems with a conventional technology incurred by the adhesive used for providing the separate polarizing and phase plates, for example, reduction in yield by invasion of air bubbles and reduction in reliability by quality deterioration of the adhesive by heat and moisture can be solved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus having an input function, comprising:
    a first substrate, a second substrate, and a third substrate;
    a display medium provided between the first substrate and the second substrate;
    a first electrode provided between the first substrate and the display medium;
    a second electrode provided between the second substrate and the display medium;
    spacers for supporting the second substrate and the third substrate with respect to each other; and
    at least two electrodes provided between the second substrate and the third substrate,
    wherein the display medium includes a polymer projection and a liquid crystal region at least partially surrounded by the polymer projection, and
    wherein the first, second and third substrates are each formed of a polymer material, at least one of the first, second and third substrates has a polarizing function, and at least one of the first, second and third substrates has a phase contrasting function.

2. A liquid crystal display device having an input function according to claim 1, wherein at least one of the first, second and third substrates is formed of either one of a polymer film or a lamination of a plurality of polymer films.

3. A liquid crystal display device having an input function according to claim 1, wherein at least one of the first, second and third substrates has a thickness of about 0.05 mm to about 0.5 mm.

4. A liquid crystal display device having an input function according to claim 1, further comprising a reflection layer provided on the first substrate.

5. A liquid crystal display device having an input function according to claim 2,
    wherein the first substrate includes a polarizing function, the second substrate has a phase contrasting function, and the third substrate has a polarizing function, and
    wherein the second substrate is formed of either one of a polymer film or a lamination of a plurality of polymer films.

6. A liquid crystal display device having an input function according to claim 2,
    wherein the first substrate includes a polarizing function, and the second substrate has a polarizing function and a phase contrasting function, and
    wherein the second substrate is formed of either one of a polymer film or a lamination of a plurality of polymer films.

7. A liquid crystal display device having an input function according to claim 2,
    wherein the first substrate includes a polarizing function, and the third substrate has a polarizing function and a phase contrasting function, and
    wherein the third substrate is formed of either one of a polymer film or a lamination of a plurality of polymer films.

8. A liquid crystal display device having an input function according to claim 2, wherein the first substrate includes a polarizing function, and the second substrate has a polarizing function and a phase contrasting function.

9. A liquid crystal display device having an input function according to claim 1, wherein the second substrate, the third substrate, and an area interposed between the second substrate and the third substrate are included in a data input device operable by either one of a pressure-sensitive system or an electrostatic induction system.

10. A method for producing a liquid crystal display device having an input function, comprising the steps of:
    forming a first substrate, a second substrate and a third substrate;
    forming a display medium between the first substrate and the second substrate;
    forming a first electrode between the first substrate and the display medium;
    forming a second electrode between the second substrate and the display medium;
    providing spacers between the second substrate and the third substrate; and
    forming at least two electrodes between the second substrate and the third substrate,
    wherein the display medium is formed to include a polymer projection and a liquid crystal region at least partially surrounded by the polymer projection, and
    wherein the first, second and third substrates are each formed of a polymer material, at least one of the first, second and third substrates is formed to have a polarizing function, and at least one of the first, second and third substrates is formed to have a phase contrasting function.

11. A method for producing a liquid crystal display device having an input function according to claim 10, wherein the step of forming the display medium includes the steps of:
    injecting a mixture including at least a liquid crystal material; a photopolymerizable resin, and a photoinitiator into a space between the first substrate and the second substrate, and
    radiating ultraviolet light toward the mixture to phase-separate the mixture into the liquid crystal material and a polymer projection.

12. A method for producing a liquid crystal display device having an input function according to claim 11, wherein the step of forming the display medium includes the step of radiating the ultraviolet light through a photomask having a pattern and toward the mixture, the photomask shielding at least the ultraviolet light.

13. A method for producing a liquid crystal display device having an input function according to claim 11, wherein the step of forming the display medium includes the step of radiating the ultraviolet light toward the mixture using at least one of the first electrode and the second electrode as a photomask, the first electrode and the second electrode absorbing the ultraviolet light.

14. A method for producing a liquid crystal display device having an input function according to claim 10, wherein the step of forming the display medium includes the steps of:

forming the polymer projection over either one of the first substrate or the second substrate, dropping the liquid crystal material to be put over one of the first substrate or the second substrate, and assembling the first substrate and the second substrate.

15. A method for producing a liquid crystal display device having an input function according to claim 10, further comprising the steps of:

forming a rugged surface area in a surface of the first substrate by embossing, and forming a reflection layer on the rugged surface area of the first substrate.

* * * * *